(12) United States Patent
Kano

(10) Patent No.: US 8,194,396 B2
(45) Date of Patent: Jun. 5, 2012

(54) AC ADAPTER UNIT, STORAGE TRAY FOR AN AC ADAPTER AND ELECTRONIC DEVICE

(75) Inventor: Tomohisa Kano, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/890,378

(22) Filed: Sep. 24, 2010

(65) Prior Publication Data

US 2011/0068043 A1 Mar. 24, 2011

(30) Foreign Application Priority Data

Sep. 24, 2009 (JP) ................................. 2009-218630

(51) Int. Cl.
*H02B 1/20* (2006.01)
(52) U.S. Cl. ......... 361/623; 361/826; 439/501; 363/146
(58) Field of Classification Search .......... 361/600–601, 361/622, 623, 625, 679, 1, 679.02, 825–827
See application file for complete search history.

(56) References Cited

U.S. PATENT DOCUMENTS

| | | | | |
|---|---|---|---|---|
| 5,372,225 A | * | 12/1994 | Joynes et al. ............ | 191/12.2 R |
| 6,304,428 B1 | * | 10/2001 | Sato ........................... | 361/600 |
| 7,529,099 B2 | * | 5/2009 | Ishii .......................... | 361/747 |
| 2003/0008550 A1 | * | 1/2003 | Tse et al. ................... | 439/501 |
| 2003/0045163 A1 | * | 3/2003 | Lee et al. ................... | 439/501 |
| 2005/0042914 A1 | * | 2/2005 | Hering ....................... | 439/501 |

FOREIGN PATENT DOCUMENTS

| | | |
|---|---|---|
| JP | 11-284368 A | 10/1999 |
| JP | 2000-164306 A | 6/2000 |
| JP | 2001-015950 A | 1/2001 |
| JP | 2007-328859 A | 12/2007 |

* cited by examiner

*Primary Examiner* — Courtney Smith
(74) *Attorney, Agent, or Firm* — Kilpatrick Townsend & Stockton LLP

(57) ABSTRACT

An AC adapter unit compactly houses the AC adapter block and DC cable so that radiation noise from the DC cable is not amplified. The AC adapter unit 4 has an AC adapter 7 that includes an AC adapter block 52 and a DC cable 51, and a storage tray 6 that stores the AC adapter 7. The connector-side cable part 51b of the DC cable 51 is stored in the storage tray 6 on the left-side part 6D of the AC adapter block 52. The connector-side cable part 51b has a bundled part 51c with a figure-8 shape when seen from the top opening 6a side of the storage tray 6. The long axis of this bundled part 51c is parallel to the long axis of the AC adapter block 52. Because the DC cable 51 has a figure-8 shaped bundled part 51c, the part that runs parallel to electronic circuit boards inside the AC adapter block 52 is reduced and amplification of radiation noise is reduced.

7 Claims, 6 Drawing Sheets

AC ADAPTER UNIT, STORAGE TRAY FOR AN AC ADAPTER AND ELECTRONIC DEVICE

This application claims priority under 35 U.S.C. §119 to Japanese Patent Application No. 2009-218630 filed on Sep. 24, 2009, the entire disclosure of which is expressly incorporated by reference herein.

BACKGROUND

1. Technical Field

The present invention relates to an AC adapter unit that compactly houses the AC adapter block and DC cable so that radiation noise from the DC cable is not amplified, to a storage tray for the AC adapter, and to an electronic device unit.

2. Related Art

Electronic devices, including printers, that are driven by DC power commonly have an AC adapter separate from the electronic device as a power supply that converts AC power to DC power. For example, the AC adapter taught in Japanese Unexamined Patent Appl. Pub. JP-A-2000-164306 has an AC adapter block in which an AC inlet, to which an AC cable is removably connected, is formed, and a DC cable extending from the AC adapter block. If the AC cable is connected to the AC inlet and the plug of the AC cable is connected to an AC power outlet, the AC power supplied through the AC cable to the AC adapter is converted by the AC adapter block to DC power and supplied through the DC cable to the electronic device.

The DC cable of the AC adapter is generally long enough that the electronic device can be placed where desired by extending the DC cable. As a result, this long DC cable can interfere when the AC adapter block is placed near the electronic device. By using a single AC adapter that meets required safety standards for a plurality of different electronic devices, the production cost can be kept down while assuring product safety. Providing plural AC adapters with different DC cable lengths as the AC adapter for a single electronic device is therefore difficult.

This problem can conceivably be solved by bundling and storing the DC cable with the AC adapter block in the housing of the electronic device or a storage case. However, depending on how the DC cable is bundled and the relative positions of the DC cable and the AC adapter block when stored together, radiation noise from the DC cable may be amplified when the AC adapter is used as the power supply and adversely affect other nearby electronic devices.

SUMMARY

An AC adapter unit, a storage tray for an AC adapter, and an electronic device unit according to the present invention compactly store the AC adapter block and DC cable so that radiation noise from the DC cable is not amplified.

A first aspect of the invention is an AC adapter unit including an AC adapter that has an AC adapter block having an AC inlet, and a DC cable extending from the AC adapter block; and a storage tray having a carrying surface on which the AC adapter is placed. The DC cable has a bundled part that is bundled in a figure-8 shape when seen from a direction perpendicular to the carrying surface of the storage tray; and the AC adapter block and bundled part of the DC cable are stored in adjacent positions on the carrying surface so that the length of the AC adapter block and the length of the bundled part of the DC cable are parallel.

Because DC cable is bundled and is stored so that the bundled part of the DC cable is on the carrying surface of the storage tray adjacent to the AC adapter block and the long axis of the bundled part of the DC cable and the long axis of the AC adapter block are parallel, the size of both the AC adapter block and the DC cable storage space can be reduced. The storage tray can therefore be made small and the AC adapter unit can be rendered compactly.

If the DC cable is bundled in an oval shape and placed beside the AC adapter block, the portion of the cable running parallel to electronic circuits inside the AC adapter block is increased in the bundled part of the DC cable, and radiation noise from the DC cable is amplified when the AC adapter is used as the power supply. In addition, because parts of a cable wound in an oval run parallel in contact with each other when the bundled part is an oval, radiation noise is amplified.

However, because the DC cable is bundled into a figure-8 shape when seen from a direction perpendicular to the carrying surface of the storage tray and disposed beside the AC adapter block, the amount of cable running parallel to electronic circuits inside the AC adapter block is reduced. In addition, because the sections of cable at the intersecting part of the figure-8 are separated the distance of the cable diameter, the length of contact between adjacent cable runs is reduced. As a result, amplification of radiation noise is reduced.

Further preferably, in order to simplify storing the DC cable bundled in a figure-8 shape on the storage tray in another aspect of the invention, a pair of cable winding holders protrude from where the bundled part of the DC cable rests on the carrying surface with a specific gap therebetween on the long axis of the bundled part; and the bundled part of the DC cable is wound with the pair of curved parts of the figure-8 shape located at the opposite lengthwise ends of the bundled part around the pair of cable winding holders.

Further preferably, in order to hold the DC cable bundled in a figure-8 shape on the storage tray in another aspect of the invention, holding tabs are formed protruding to the outside lengthwise to the bundled part from the top parts of the pair of cable winding holders.

Further preferably, in order to bundle the DC cable in a figure-8 shape on the storage tray in another aspect of the invention, a pair of opposing cable guides protrude with the gap therebetween in a direction perpendicular to the length of the bundled part greater than the diameter and less than twice the diameter of the DC cable from a position on the carrying surface approximately centered between the pair of cable winding holders; and the bundled part of the DC cable is disposed with the intersecting part of the figure-8 shape between the pair of cable guides.

Further preferably, in order to reduce radiation noise from the DC cable when the AC adapter unit is used as a power supply in another aspect of the invention, a ferrite core is attached to the DC cable; a first cable part of the DC cable on the AC adapter side of the of the ferrite core, and a second cable part of the DC cable on the opposite side of the ferrite core as the AC adapter, are stored so that they do not overlap; and the bundled part is formed in the second cable part.

Yet further preferably in another aspect of the invention, in order to connect an AC cable to the AC adapter unit, an opening exposing the AC inlet part of the AC adapter block to the outside is formed in the storage tray.

Another aspect of the invention is an electronic device unit including an electronic device driven by DC power, and an AC adapter unit described above, wherein the storage tray of the AC adapter unit is attached from the bottom side to a bottom part of the electronic device.

Because the AC adapter unit is attached to the electronic device with the electronic device unit according to this aspect of the invention, the AC adapter unit does not interfere with installing the electronic device unit. In addition, because the electronic device and the AC adapter unit are disposed one above the other with this electronic device unit, the electronic device unit requires less installation space.

In an electronic device unit according to another aspect of the invention, the electronic device is a printer. With this aspect of the invention, the AC adapter does not interfere with installation when the printer is installed in a confined space such as at the checkout counter of a store or a restaurant kitchen.

EFFECT OF THE INVENTION

Because DC cable is bundled and is stored so that the bundled part of the DC cable is on the carrying surface of the storage tray adjacent to the AC adapter block and the long axis of the bundled part of the DC cable and the long axis of the AC adapter block are parallel, the size of both the AC adapter block and the DC cable storage space can be reduced. The storage tray can therefore be made small and the AC adapter unit can be rendered compactly.

Furthermore, because the DC cable is bundled into a figure-8 shape when seen from a direction perpendicular to the carrying surface of the storage tray and disposed beside the AC adapter block, the amount of cable running parallel to electronic circuits inside the AC adapter block is reduced. In addition, because the sections of cable at the intersecting part of the figure-8 are separated the distance of the cable diameter, the length of contact between adjacent cable runs is reduced. As a result, amplification of radiation noise is reduced when the AC adapter is used as a power supply device.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of a printer unit according to a preferred embodiment of the invention is described below with reference to the accompanying figures.

Printer Unit

Figure 1:
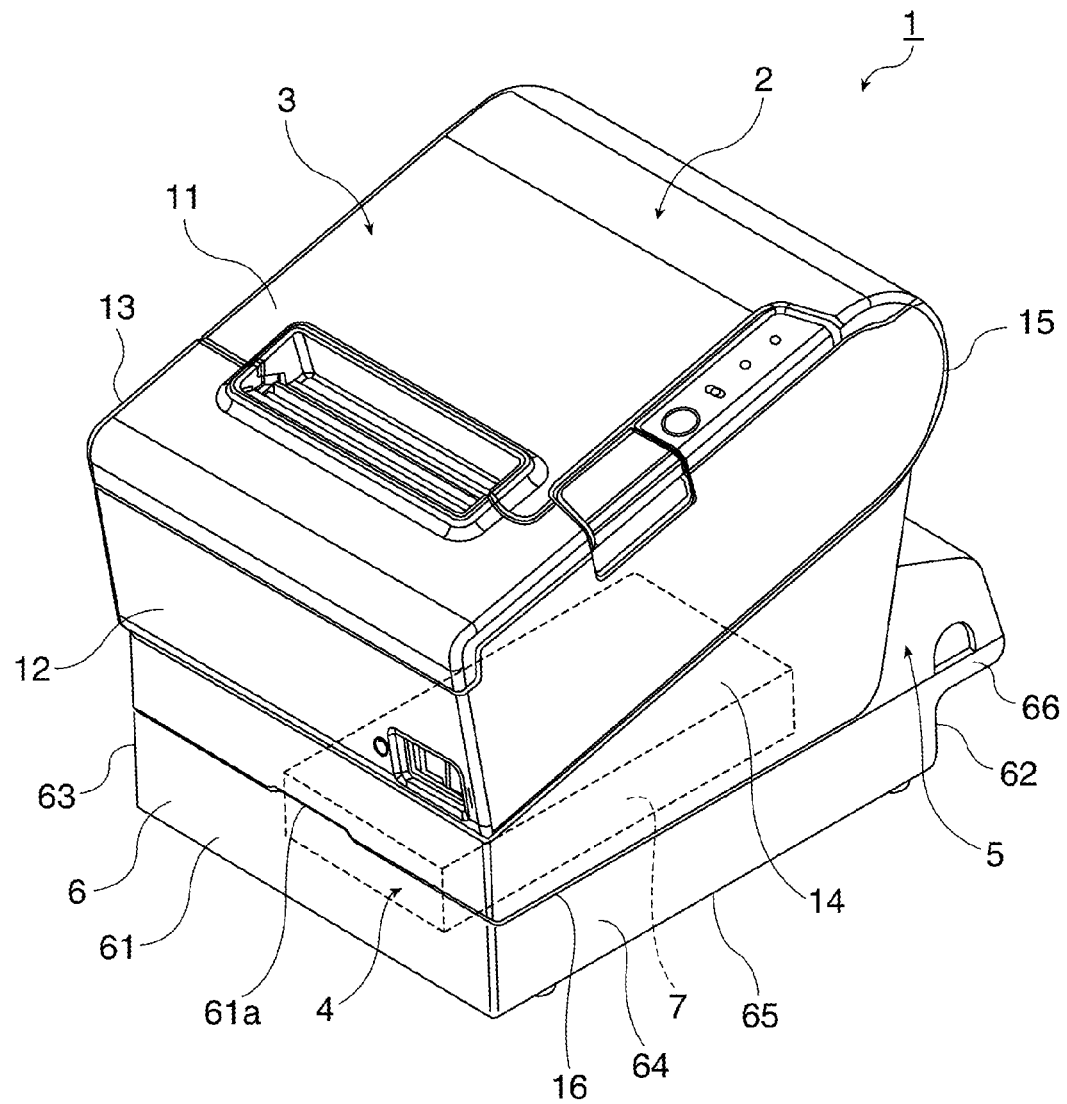
FIG. 1 is an external oblique view showing the appearance of a printer unit according to the present invention.

FIG. 1 is an external oblique view of a printer unit. The printer unit 1 includes a roll paper printer 2, an AC adapter unit 4 that is removably attached from below to the bottom of the roll paper printer 2 printer case 3, and a cable cover 5 that is removably attached to the roll paper printer 2 so that it covers the rear bottom portion of the printer case 3 from the back.

The roll paper printer 2 is typically used connected to a host device, and prints receipts, for example, to a web of recording paper that is delivered from a paper roll stored inside the printer case 3.

The AC adapter unit 4 is a power supply that converts AC power to DC power and supplies DC power to the roll paper printer 2, and stores an AC adapter 7 inside a storage tray 6. The cable cover 5 covers the pull-out part of cables that are pulled out to the back from the roll paper printer 2 printer case 3.

The printer case 3 has a case top 11 that slopes down to the front; a case front 12 that slopes from the front edge of the case top 11 down towards the back, and then extends down vertically to the printer; left and right case sides 13 and 14 that extend vertically to the printer down from the left and right sides of the case top 11 on the opposite sides of the printer width, and then pass through a shoulder that is recessed to the inside and extend down vertically to the printer; a case back 15 that curves down towards the back from the back side of the case top 11, and then slopes slightly to the front and down; and a case bottom 16 that defines the bottom of this printer case 3.

The storage tray 6 includes a tray front 61 and a tray back 62 that define the front and back of the storage tray 6; left and right tray sides 63 and 64 that define the left and right sides of the storage tray 6 widthwise to the printer; and a tray bottom 65 that defines the bottom of the storage tray 6. A flange 66 extends to the back from the top part of the tray back 62.

The case front 12 and tray front 61 are disposed on the same plane, and the sides of the left and right case sides 13 and 14 and the left and right tray sides 63 and 64 are on the same plane.

The cable cover 5 covers the back bottom part of the printer case 3 when installed to the flange 66 of the storage tray 6.

Roll Paper Printer

Figure 2A:
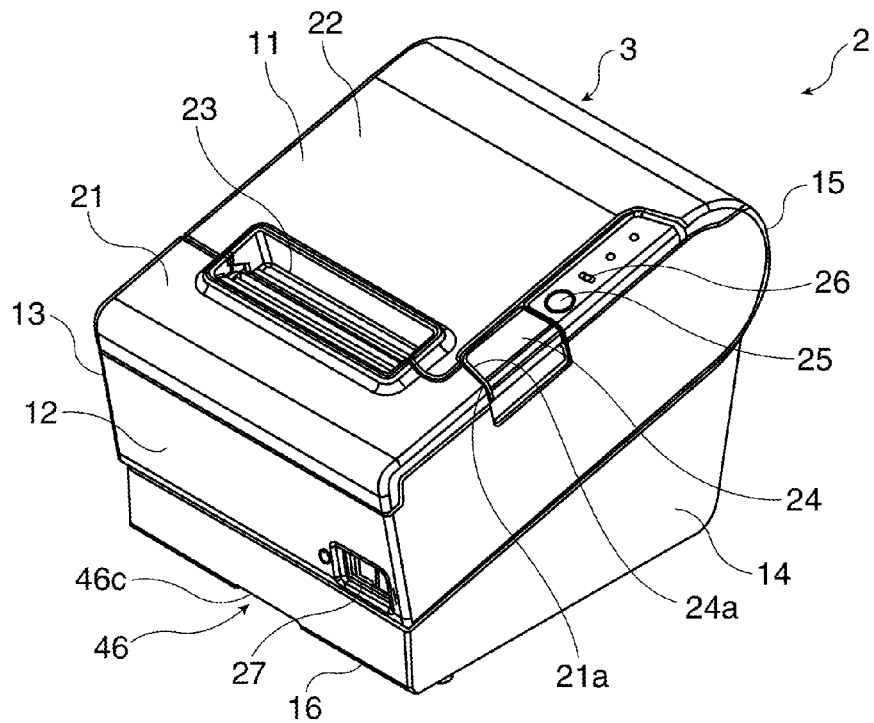
FIG. 2 is an external oblique view of a roll paper printer.
Figure 2B:
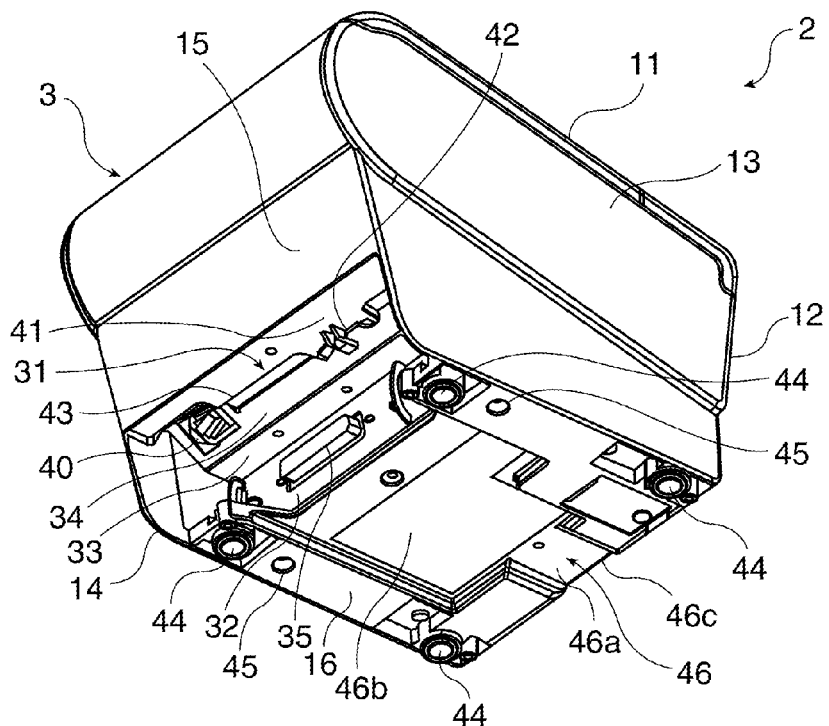

FIG. 2A is an oblique view of the roll paper printer from diagonally above the front, and FIG. 2B is an oblique view from diagonally below the back of the roll paper printer.

Figure 3:
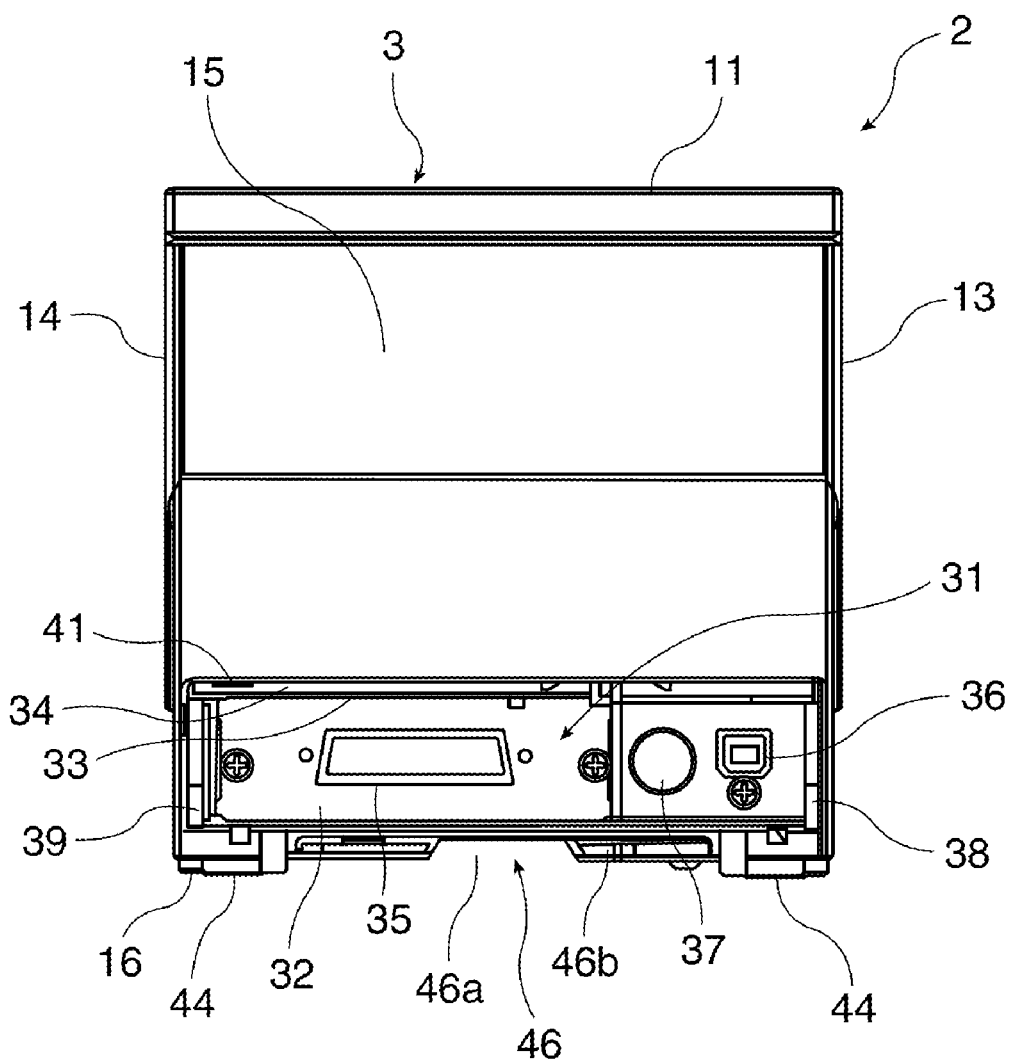
FIG. 3 shows the back of the roll paper printer.

FIG. 3 shows the back of the roll paper printer.

As shown in FIG. 2A, a front access cover 21 and a rear access cover 22 are attached to the case top 11 of the printer case 3.

The front access cover 21 pivots open and closed at the front end thereof, and the rear access cover 22 pivots open and closed at the back end thereof. A rectangular paper exit 23 of a specific width is formed between the front access cover 21 and rear access cover 22.

An operating button 24 for opening and closing the rear access cover 22 is disposed at the edge of the case top 11 on the right side of the paper exit 23. When the operating button 24 is pushed down, the rear access cover 22 lock is released and the rear access cover 22 pivots up and open by means of an urging force from a spring, for example. Opening the rear access cover 22 opens the roll paper compartment in which roll paper is stored, and enables loading roll paper in the roll paper compartment.

The front edge 24a of the operating button 24 slopes forward to the right, and the rear edge part 21a on the right side of the front access cover 21 adjacent to the right side of the operating button 24 is cut out so that it slopes forward to the right corresponding to the slope of the front edge 24a of the operating button 24. As a result of this configuration, when the user operates the operating button 24 with a finger on the right hand from in front of the roll paper printer 2, interference between the user's finger and the part of the roll paper printer 2 adjacent to the right side of the operating button 24 can be avoided or reduced. Opening and closing the rear access cover 22 is therefore simple and loading the roll paper is easy with the roll paper printer 2 according to this embodiment of the invention.

A paper feed switch 25 and a plurality of operating indicators 26 are disposed behind the operating button 24. A power switch 27 is disposed at the front of the printer case 3.

As shown in FIG. 2B and FIG. 3, a void covering substantially the entire width of the printer is formed in the bottom of the case back 15 part of the printer case 3, rendering a cable connection unit 31 that is recessed at the front.

The cable connection unit 31 includes a rear-facing end face 32 that extends vertically to the printer and faces the back; a bottom-facing surface 33 that extends a specific width from the top of the end face 32 to the back in the front-back direction of the printer; and an inclined surface 34 that slopes up to the back from the top edge of the bottom-facing surface 33. An RS-232 connector 35 and a USB connector 36 for connecting to a host device, for example, are disposed to the end face 32. A power connector 37 for receiving a DC power supply is disposed between the RS-232 connector 35 and USB connector 36.

Connection holes 38 and 39 for receiving pins 88c, 88d (see FIG. 6) disposed to the cable cover 5 are formed in the widthwise edges of the end face 32.

A drawer kick connector 40 for connecting a cash drawer device in which payments and change are stored is disposed a widthwise end part of the inclined surface 34. A connector plate 41 extends widthwise to the printer behind the drawer kick connector 40, and engaging parts 42, 43 for engaging hooks 88a, 88b (see FIG. 6) disposed to the cable cover 5 are formed with the connector plate 41.

Four feet 44 on which the roll paper printer 2 rests when the roll paper printer 2 is used without the AC adapter unit 4 are formed at the four corners of the case bottom 16. Screw holes 45 are formed near the rear two of these feet 44.

A channel 46 connecting the front side of the roll paper printer 2 to the back side of the roll paper printer 2 through the cable connection unit 31 is formed in the center of the case bottom 16 widthwise to the printer.

When the roll paper printer 2 is used without using the AC adapter unit 4, this channel 46 is used to pass the cables connected to connectors 35 to 37 and 40 to the front of the roll paper printer 2. More specifically, the combined size of the depth of the channel 46 and the height of the feet 44 is slightly greater than the diameter of the thickest cable connected to any of the connectors 35 to 37 and 40, that is, DC cable 51 (see FIG. 4), the RS-232 cable, USB cable, and cash drawer connection cable. By passing the cables connected to the connectors 35 to 37 and 40 through the channel 46, the cables can be pulled passing below the printer case 3 to the front of the roll paper printer 2.

The channel 46 has a narrow front channel part 46a, and a back channel part 46b that is wider than the front channel part 46a between the front channel part 46a and cable connection unit 31.

The width of the front channel part 46a, that is, the width of the opening 46c formed in the front bottom end of the printer case 3, is determined based on the total diameter of the plural cables that are most likely to pass through the channel 46 at the same time. More specifically, because the RS-232 cable and USB cable that are used to connect to the host device are typically not used at the same time, the width of the front channel part 46a is slightly greater than the greater of the combined width of the DC cable 51, RS-232 cable, and cash drawer connection cable, and the combined width of the DC cable 51, RS-232 cable, and USB cable. Note that the width of the front channel part 46a of the channel 46 may be slightly greater than the combined width of the four cables, that is, DC cable 51, RS-232 cable, USB cable, and cash drawer connection cable.

The width of the back channel part 46b is greater than the combined width of the front channel part 46a and the width of the AC adapter block 52 (see FIG. 4) widthwise to the storage tray 6 in which the AC adapter 7 is held. As described below, the top part of the AC adapter block 52 protruding above the top opening 6a of the storage tray 6 is inserted to the back channel part 46b. As a result, the width of the channel 46 minus the width occupied by the AC adapter block 52 is greater than the width of the front channel part 46a so that the cables connected to the connectors 35 to 37 and 40 can pass through the back channel part 46b.

AC Adapter Unit

Figure 4A:
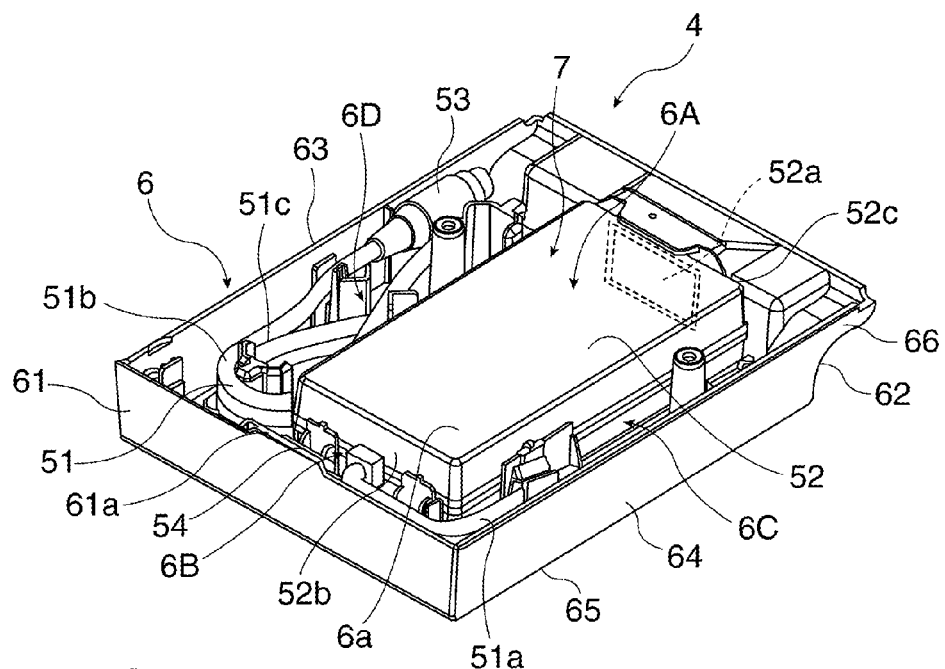
FIG. 4 is an oblique view and a plan view of the AC adapter unit.
Figure 4B:
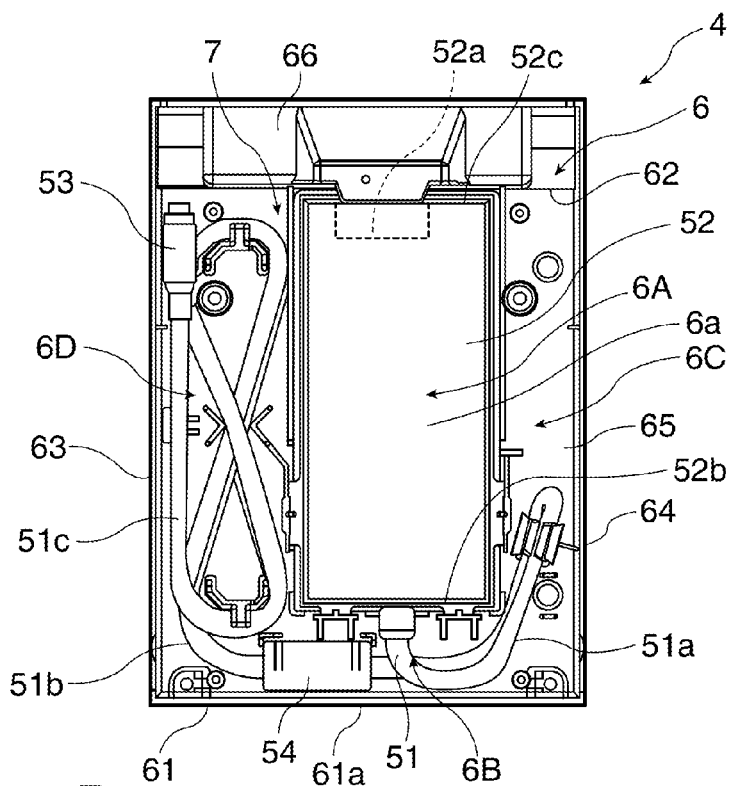

FIG. 4A is an oblique view of the AC adapter unit, and FIG. 4B is a plan view thereof.

The AC adapter unit 4 includes the AC adapter 7 and a plastic storage tray 6. The AC adapter 7 includes the AC adapter block 52 in which the AC inlet 52a is formed, and the DC cable 51 extending from the AC adapter block 52. The storage tray 6 stores the AC adapter 7 on the tray bottom 65 (carrying surface).

The AC adapter block 52 is a substantially rectangular block. The DC cable 51 extends from the center part of the front side 52b of the AC adapter block 52. A cable-side power connector 53 for connecting the power connector 37 of the roll paper printer 2 is disposed at the distal end end of the DC cable 51. A ferrite core 54 for reducing radiation noise is disposed in the middle of the DC cable 51.

The AC inlet 52a is formed in the back end part 52c of the AC adapter block 52, and an AC cable not shown having a plug for connecting to an AC power outlet can be removably connected to the AC inlet 52a. When the AC cable is connected to an outlet and the DC cable 51 is connected to the power connector 37 of the roll paper printer 2, the AC adapter 7 converts AC power supplied from the outlet through the AC cable to DC power by means of the AC adapter block 52, and supplies DC power through the DC cable 51 to the roll paper printer 2.

So that the long side thereof is aligned with the front-back direction of the tray, the AC adapter block 52 is stored in the center-right part 6A of the storage tray 6 offset slightly to the right from the center of the tray width. The top of the AC adapter block 52 protrudes slightly above the top opening 6a of the storage tray 6, and when the AC adapter unit 4 is attached to the printer case 3 this protruding part is inserted to the back channel part 46b of the channel 46.

The DC cable 51 is stored with the part to which the ferrite core 54 is attached in the front part 6B at the front of the AC adapter block 52. The adapter-side cable part (first cable part) 51a of the DC cable 51 on the AC adapter 7 side of the ferrite core 54 is pulled around to the right-side part 6C on the right side of the AC adapter block 52. The connector-side cable part (second cable part) 51b on the cable-side power connector 53 of the ferrite core 54 is pulled around to the left-side part 6D on the left side of the AC adapter block 52.

The connector-side cable part 51b has a bundled part 51c that is bundled in a figure-8 shape when seen from a side perpendicular to the tray bottom 65 of the storage tray 6. The bundled part 51c is stored in the right-side part 6C with the length thereof parallel to the long side of the AC adapter block 52. Note that in FIG. 4 the cable-side power connector 53 is shown stored in the storage tray 6, but when the AC adapter unit 4 is attached to the printer case 3 and used as the power supply of the roll paper printer 2, the cable-side power connector 53 is pulled up from the storage tray 6 and connected to the power connector 37.

Figure 5A:
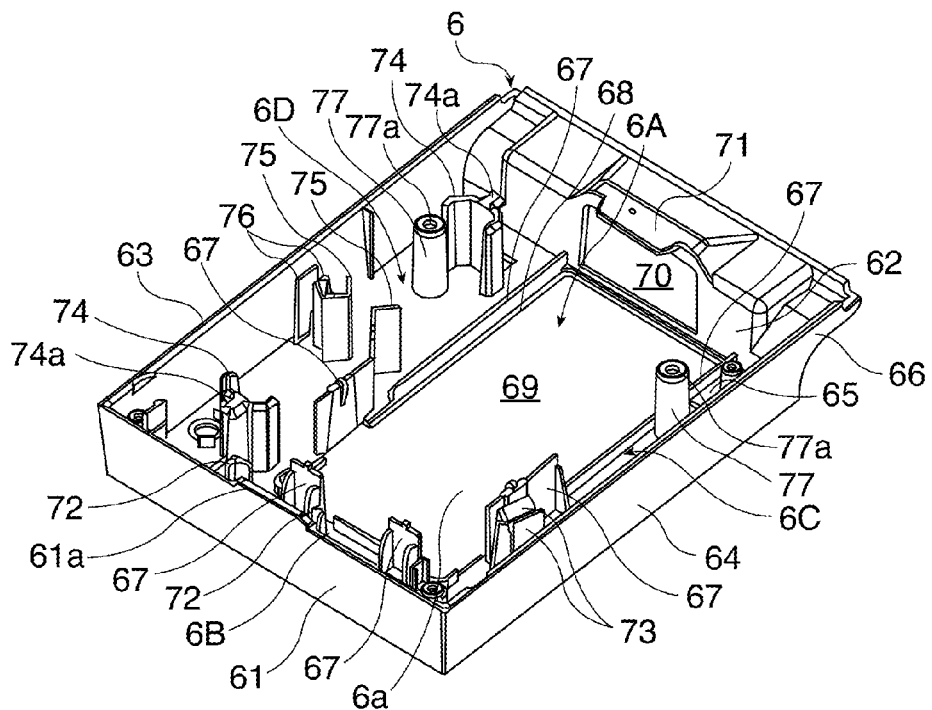
FIG. 5 is an oblique view and a plan view of the storage tray.
Figure 5B:
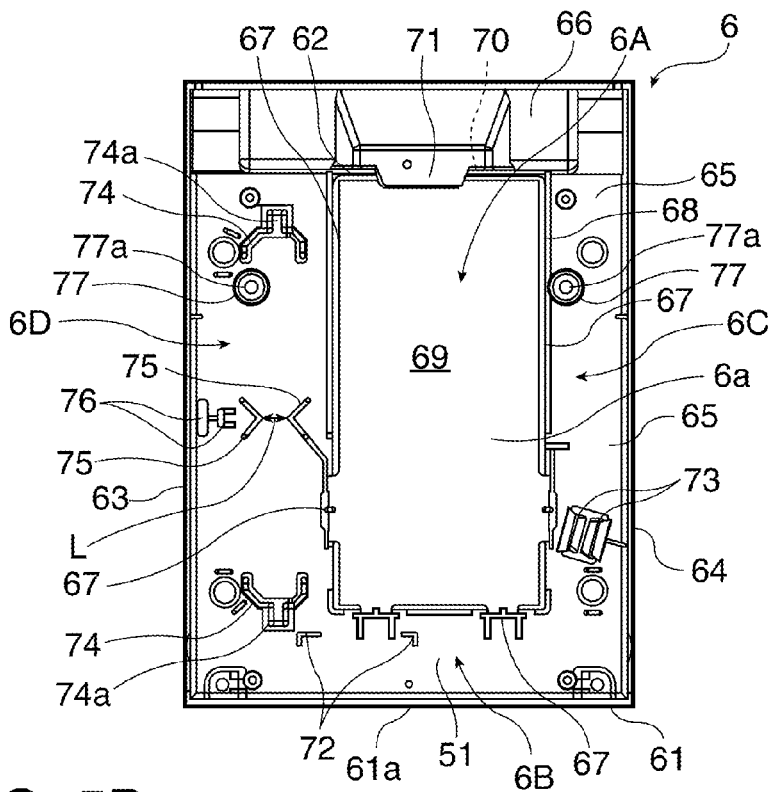

FIG. 5A is an oblique view and FIG. 5B is a plan view of the storage tray. A plurality of flat AC adapter holding plates 67 protrude perpendicularly from the center-right part 6A of the tray bottom 65 and divide the center-right part 6A into a shape corresponding to the shape of the AC adapter block 52. A rectangular opening 69 is formed in the tray bottom 65 inside the AC adapter holding plates 67 leaving a slight rim 68. This opening 69 discharges heat produced by the AC adapter block 52 to the outside of the storage tray 6.

A rectangular AC inlet opening 70 is formed in the tray back 62 at a position facing the center-right part 6A. When the AC adapter block 52 is stored in the center-right part 6A, the AC inlet 52a is exposed to the outside from the AC inlet opening 70. The AC cable can therefore be connected to the AC adapter block 52 from outside the storage tray 6 through the AC inlet opening 70. An AC adapter block holding plate 71 protrudes to the front from the top edge part of the tray back 62 at the top side of the AC inlet opening 70. When the AC adapter block 52 is stored in the center-right part 6A, the AC adapter block holding plate 71 contacts the back end part of the top of the AC adapter block 52 and prevents the AC adapter block 52 from moving up.

A pair of ferrite core holding blocks 72 for holding the ferrite core 54 protrude from the front part 6B of the tray bottom 65. The ferrite core 54 is secured between this pair of ferrite core holding blocks 72 and the tray front 61 of the storage tray 6.

A pair of fingers 73 rendering a snap-in cable holder protrude from the right-side part 6C of the tray bottom 65. The adapter-side cable part 51a is inserted between this pair of fingers 73 and secured.

A pair of cable winding holders 74 protrude from the left-side part 6D of the tray bottom 65 at opposing positions with a specific gap therebetween in the front-back direction of the tray (the long direction of the bundled part 51c of the DC cable 51). This pair of cable winding holders 74 have an arcuate plane shape protruding towards the outside of the front-back direction of the tray. A holding tab 74a protrudes to the outside in the front-back direction of the tray at the top end of the pair of cable winding holders 74.

A pair of cable guides 75 that face each other widthwise to the storage tray 6 (perpendicular to the length of the bundled part 51c of the DC cable 51) protrude from the middle between the pair of cable winding holders 74. These pair of cable guides 75 are flat and have a peak in the center of the front-back direction of the tray. These peaks protrude to the inside between the pair of cable guides 75 facing each other. The distance L between the pair of cable guides 75 is greater than the diameter of the DC cable 51 and less than twice this diameter. A pair of fingers 76 rendering a snap-in cable holder protrude on the left side of the pair of cable guides 75.

When the bundled part 51c of the DC cable 51 is stored in the left-side part 6D of the storage tray 6, the bundled part 51c of the DC cable 51 is disposed with the pair of curved parts of the figure-8 at the opposite ends of the length of the bundled part 51c wrapped around the pair of cable winding holders 74. The holding tabs 74a prevent the cable from separating up. The part of the bundled part 51c where the DC cable 51 crosses itself in the figure-8 is positioned between the pair of cable guides 75. The part of the DC cable 51 near the cable-side power connector 53 is inserted and held between the pair of fingers 76.

Cylindrical tray holding pillars 77 each having a screw hole 77a in the center protrude from the back parts of the right-side part 6C and left-side part 6D of the tray bottom 65. The AC adapter unit 4 is attached to the roll paper printer 2 by screws (not shown in the figure) passing from below the tray bottom 65 through the screw holes 77a in the tray holding pillars 77 to the screw holes 45 in the printer case 3 bottom.

A tab 61a is formed protruding up from the top opening 6a at the top of the tray front 61 in the center widthwise to the tray. As shown in FIG. 1, when the storage tray 6 is attached to the printer case 3, the tab 61a closes the opening 46c in the channel 46 formed at the bottom front part of the printer case 3.

Cable Cover

Figure 6:
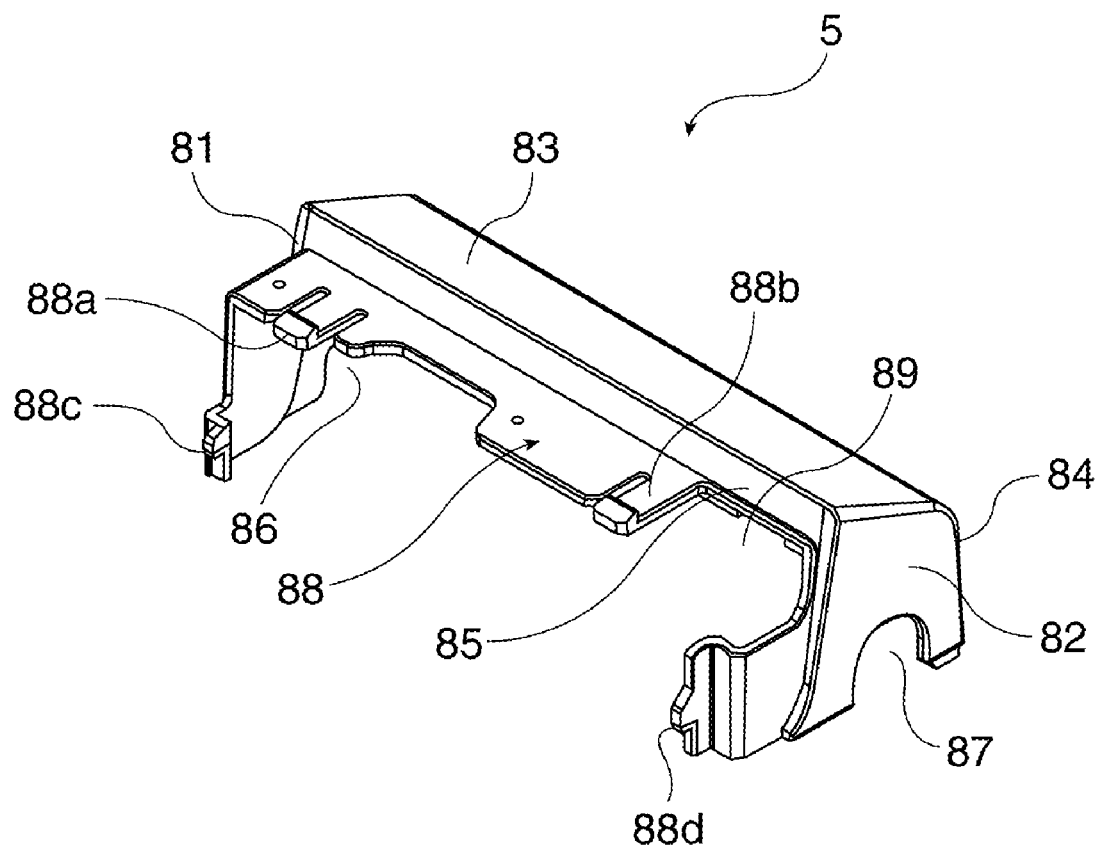
FIG. 6 is an oblique view of the cable cover.

FIG. 6 is an oblique view of the cable cover.

The cable cover 5 is plastic and has a pair of basically trapezoidal cover side parts 81 and 82 on the left and right sides, a top cover part 83 spanning between the tops and a back cover part 84 spanning between the back ends of the pair of cover side parts 81 and 82, and a narrow front cover part 85 that spans between the front top parts of the sides. Semicircular notches 86 and 87 are formed at the bottom edge part of the pair of cover side parts 81 and 82. When the cables connected to the connectors 35 to 37 and 40 of the cable connection unit 31 are passed out to the side of the roll paper printer 2, the cables pass through these notches 86 and 87.

The cable cover 5 also has a connecting plate 88 that protrudes to the front from the inside front edge of the left cover side part 81, the bottom edge of the front cover part 85, and the inside front edge of the right cover side part 82. A notch 89 is formed in the connecting plate 88 near the right cover side part 82 so that when the cable cover 5 is attached to the printer case 3 it does not interfere with the drawer kick cable connected to the drawer kick connector 40.

When the cable cover 5 is attached to the printer case 3, the connecting plate 88 is inserted to the cable connection unit 31 from the back of the printer case 3. When the connecting plate 88 is inserted to the cable connection unit 31, the connecting plate 88 contacts the inside surface of the left and right case sides 13 and 14 of the printer case 3 and the bottom of the connector plate 41, the left and right hooks 88a, 88b disposed to the connecting plate 88 are engaged by the engaging parts 42, 43 of the connector plate 41, and the left and right pins 88c, 88d protruding from the front edge of the connecting plate 88 are inserted to the connection holes 38 and 39 formed in the back-facing end face 32. When the cable cover 5 is attached to the printer case 3, the cable cover 5 rests on the flange 66 of the storage tray 6 and covers the cable connection unit 31.

Effect of the AC Adapter Unit

The space occupied by the AC adapter block 52 and DC cable 51 of the AC adapter unit 4 according to this embodiment of the invention is small because the DC cable 51 is bundled and held at an adjacent position on the tray bottom 65 of the storage tray 6 with the long axis of the bundled part of the DC cable 51 parallel to the long axis of the AC adapter block 52. The storage tray 6 can therefore be made small, and the AC adapter unit 4 can be rendered compactly.

If the DC cable 51 is bundled in an oval shape and placed beside the AC adapter block 52, the portion of the cable running parallel to electronic circuits inside the AC adapter block 52 is increased in the bundled part of the DC cable 51, and radiation noise from the DC cable 51 is amplified when the AC adapter 7 is used as the power supply. In addition, because parts of a cable wound in an oval run parallel in contact with each other when the bundled part 51c is an oval, radiation noise is amplified.

However, because the DC cable 51 is bundled into a figure-8 shape when seen from the top opening 6a side of the storage tray 6 and disposed beside the AC adapter block 52, the amount of cable running parallel to electronic circuits inside the AC adapter block 52 is reduced. In addition, because the bundled part 51c forms a figure-8 in this embodiment of the invention and the sections of cable at the intersecting part of the figure-8 are separated the distance of the cable diameter, the length of contact between adjacent cable runs is reduced. As a result, amplification of radiation noise is reduced.

It should be noted that our tests showed that by storing the bundled part 51*c* in a figure-8 shape in the storage tray 6, radiation noise was reduced approximately 4 dB compared with when the bundled part 51*c* is wound in an oval and stored in the storage tray 6.

In this embodiment of the invention a pair of cable winding holders 74 and a pair of cable guides 75 protrude from the left-side part 6D of the tray bottom 65 of the storage tray 6. Bundling the DC cable 51 in a figure-8 shape inside the storage tray 6 is therefore simple.

In this embodiment of the invention the adapter-side cable part 51*a* on the AC adapter 7 side of the ferrite core 54 of the DC cable 51, and the connector-side cable part 51*b* on the cable-side power connector 53 side of the ferrite core 54, are stored so that they do not overlap inside the storage tray 6. The addition of radiation noise to the part where radiation noise is reduced by the ferrite core 54 can therefore be reduced.

Furthermore, because the AC adapter unit 4 in which the AC adapter 7 is housed is attached from the bottom to the tray bottom 65 of the roll paper printer 2 printer case 3 in this embodiment of the invention, the printer unit 1 requires less installation space. The AC adapter 7 will therefore not interfere when the roll paper printer 2 is installed to a confined space such as the checkout counter of a store or a restaurant kitchen.

Note that in the embodiment described above the top of the AC adapter block 52 protrudes from the top opening 6*a* of the storage tray 6, but the height of the tray front 61, tray back 62, and left and right tray sides 63 and 64 of the storage tray 6 may be increased so that the AC adapter block 52 is contained in the storage tray 6.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An AC adapter unit comprising:
an AC adapter including an AC adapter block having an AC inlet, and a DC cable extending from the AC adapter block; and
a storage tray having a carrying surface on which the AC adapter is placed;
wherein the DC cable has a bundled part that is bundled in a figure-8 shape when seen from a direction perpendicular to the carrying surface of the storage tray; and
the AC adapter block and bundled part of the DC cable are stored in adjacent positions on the carrying surface so that the length of the AC adapter block and the length of the bundled part of the DC cable are parallel; wherein:
a ferrite core is attached to the DC cable;
a first cable part of the DC cable on the AC adapter side of the of the ferrite core, and a second cable part of the DC cable on the opposite side of the ferrite core as the AC adapter, are stored so that they do not overlap; and
the bundled part is formed in the second cable part.

2. The AC adapter unit described in claim 1, wherein:
a pair of cable winding holders protrude from where the bundled part of the DC cable rests on the carrying surface with a specific gap therebetween on the long axis of the bundled part; and
the bundled part of the DC cable is wound with the pair of curved parts of the figure-8 shape located at the opposite lengthwise ends of the bundled part around the pair of cable winding holders.

3. The AC adapter unit described in claim 2, wherein:
holding tabs are formed protruding to the outside lengthwise of the bundled part from the top parts of the pair of cable winding holders.

4. The AC adapter unit described in claim 2, wherein:
a pair of opposing cable guides protrude with an additional gap therebetween in a direction perpendicular to the length of the bundled part greater than the diameter and less than twice the diameter of the DC cable from a position on the carrying surface approximately centered between the pair of cable winding holders; and
the bundled part of the DC cable is disposed with an intersecting part of the figure-8 shape between the pair of cable guides.

5. The AC adapter unit described in claim 1, wherein:
an opening exposing the AC inlet part of the AC adapter block to the outside is formed in the storage tray.

6. An electronic device unit comprising:
an electronic device driven by DC power; and
an AC adapter unit described in claim 1;
wherein the storage tray of the AC adapter unit is attached from the bottom side to a bottom part of the electronic device.

7. The electronic device unit described in claim 6, wherein:
the electronic device is a printer.

\* \* \* \* \*